United States Patent
MacArthur et al.

(10) Patent No.: US 10,589,391 B2
(45) Date of Patent: Mar. 17, 2020

(54) SYSTEMS AND METHODS FOR RETRACTING A TOOL BIT

(71) Applicant: Honda Motor Co., Ltd., Minato-ku, Tokyo (JP)

(72) Inventors: Benjamin MacArthur, Barrie (CA); Jake Holloway, Mississauga (CA)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 15/470,350

(22) Filed: Mar. 27, 2017

(65) Prior Publication Data

US 2018/0272481 A1    Sep. 27, 2018

(51) Int. Cl.
| | |
|---|---|
| *B23P 19/06* | (2006.01) |
| *B60G 21/055* | (2006.01) |
| *B25B 23/14* | (2006.01) |
| *B25B 23/00* | (2006.01) |
| *B25B 23/147* | (2006.01) |
| *B25B 21/00* | (2006.01) |

(52) U.S. Cl.
CPC .......... *B23P 19/066* (2013.01); *B25B 21/004* (2013.01); *B25B 23/0085* (2013.01); *B25B 23/14* (2013.01); *B25B 23/147* (2013.01); *B60G 21/0551* (2013.01); *B23P 2700/14* (2013.01); *B60G 2206/92* (2013.01)

(58) Field of Classification Search
CPC .. B23P 19/066; B23P 2700/14; B25B 21/004; B25B 23/0085; B25B 23/147; B60G 21/0551; B60G 2206/92
USPC .......................................................... 81/469
See application file for complete search history.

(56) References Cited

U.S. PATENT DOCUMENTS

| | | | |
|---|---|---|---|
| 2,627,770 A | 2/1953 | Hautau et al. | |
| 2,728,252 A | 12/1955 | Connell | |
| 3,276,524 A | 10/1966 | Falter | |
| 3,584,527 A | 6/1971 | Bosten | |
| 3,612,236 A | 10/1971 | Klinten et al. | |
| 4,071,092 A | 1/1978 | Wallace | |
| 4,121,444 A * | 10/1978 | Duran | B25B 27/0007 72/114 |
| 4,467,877 A | 8/1984 | Koltermann et al. | |
| 4,576,270 A | 3/1986 | Baltz et al. | |
| 5,553,519 A | 9/1996 | Pettit | |
| 5,598,620 A * | 2/1997 | Servones | B21D 1/12 29/273 |
| 6,450,072 B1 * | 9/2002 | Koester | B25B 13/48 81/476 |
| 7,188,549 B2 * | 3/2007 | Ohtake | B25B 21/002 81/429 |
| 7,540,220 B2 * | 6/2009 | Shiao | B25B 23/1425 81/478 |

(Continued)

*Primary Examiner* — Hadi Shakeri
(74) *Attorney, Agent, or Firm* — Honda Patents & Technologies North America, LLC; Andrew Kefalonitis, Jr.

(57) ABSTRACT

A hold and drive tool for driving a target nut on a target threaded stud is provided. The target threaded stud includes a first end, a second end, and a recess defined within the first end. The hold and drive tool includes a motorized drive unit, a drive head portion coupled to the motorized drive unit and comprising: a socket; a non-rotatable torque arrest member substantially aligned with a central axis of the socket; and a retracting mechanism coupled to the non-rotatable torque arrest member and configured to move the non-rotatable torque arrest member, relative to the socket, along the central axis of the socket.

13 Claims, 9 Drawing Sheets

(56) References Cited

U.S. PATENT DOCUMENTS

| | | |
|---|---|---|
| 8,464,617 B2 | 6/2013 | Zaloga et al. |
| 8,490,517 B2 | 7/2013 | MacArthur et al. |
| 8,671,804 B2 * | 3/2014 | Galat ..................... B25B 17/00 81/56 |
| 9,987,714 B2 * | 6/2018 | Henderson .............. B23P 19/06 |

* cited by examiner

SYSTEMS AND METHODS FOR RETRACTING A TOOL BIT

BACKGROUND

The embodiments described herein relate generally to tools and methods for the assembly of parts and/or other components.

Assembly of articles sometimes involves tools known as "hold and drive" tools. These tools are used to tighten a target nut onto a corresponding target bolt or other threaded stud. The stud includes a recessed portion defined within an end of the stud, for example, a six-sided (i.e., hexagonal) recess. This recess may be referred to as a broach. The tightening tool may include a non-rotatable torque arresting member, centrally located in a socket. The arresting member typically includes a hex key, which also may be referred to as a hex bit, that interacts with the hexagonal recess included in the stud, and serves to prevent the stud from turning while the hold and drive tool is used to drive the nut on the so-arrested target stud.

Conventional hold and drive tools may be a variation of tools known as DC tools, which include an electric motor for rotating the socket. DC tools may be controlled such that they stop rotating the socket when a predefined torque has been applied. After the predefined torque is applied, it is often difficult to remove the tool from the tightened nut and stud, especially if a relative high torque has been applied. Force may need to be applied to the tool in order to dislodge the hex key from the stud. In other words, the hold and drive tool may need to be rotated clockwise and counterclockwise about the longitudinal axis of the stud in order to dislodge the hex key from the stud. Such force/rotation may cause the torque applied to the nut and stud to deviate from the desired torque (e.g., may loosen the fastener).

BRIEF DESCRIPTION

In one aspect, a hold and drive tool for driving a target nut on a target threaded stud is provided. The target threaded stud includes a first end, a second end, and a recess defined within the first end. The hold and drive tool includes a motorized drive unit, a drive head portion coupled to the motorized drive unit and comprising: a socket; a non-rotatable torque arrest member substantially aligned with a central axis of the socket; and a retracting mechanism coupled to the non-rotatable torque arrest member and configured to move the non-rotatable torque arrest member, relative to the socket, along the central axis of the socket.

In another aspect, a mechanism for retracting a non-rotatable torque arrest member of a hold and drive tool is provided. The mechanism includes a mounting bracket, a collar at least one of included within and coupled to the mounting bracket, and a linear actuator coupled to the mounting bracket. The linear actuator includes an extension member and is configured to extend and retract the extension member. The mechanism also includes a connecting bracket coupled to the extension member and configured to be coupled to the non-rotatable torque arrest member to transfer motion of the extension member to the non-rotatable torque arrest member.

In another aspect, a method of tightening a nut onto a threaded stud using a hold and drive tool is provided. The hold and drive tool includes a socket, a non-rotatable torque arrest member, and a retracting mechanism for moving the non-rotatable torque arrest member relative to the socket, axially along a longitudinal axis of the socket. The method includes holding the threaded stud in a fixed rotational position using the non-rotatable torque arrest member, rotating the nut around the threaded stud, and measuring an amount of torque applied to the nut. The method also includes activating the retracting mechanism after a predefined amount of torque is measured.

DETAILED DESCRIPTION

Implementations of methods and systems described herein facilitate removing a hold and drive tool from a tightened fastener. More specifically, the methods and systems described herein retract a non-rotatable torque arrest member from an opening defined within the tightened fastener, which enables a user of the tool to remove the hold and drive tool from the tightened fastener without negatively effecting the torque applied to the tightened fastener (i.e., maintains the amount of torque applied to the fastener).

Figure 1:
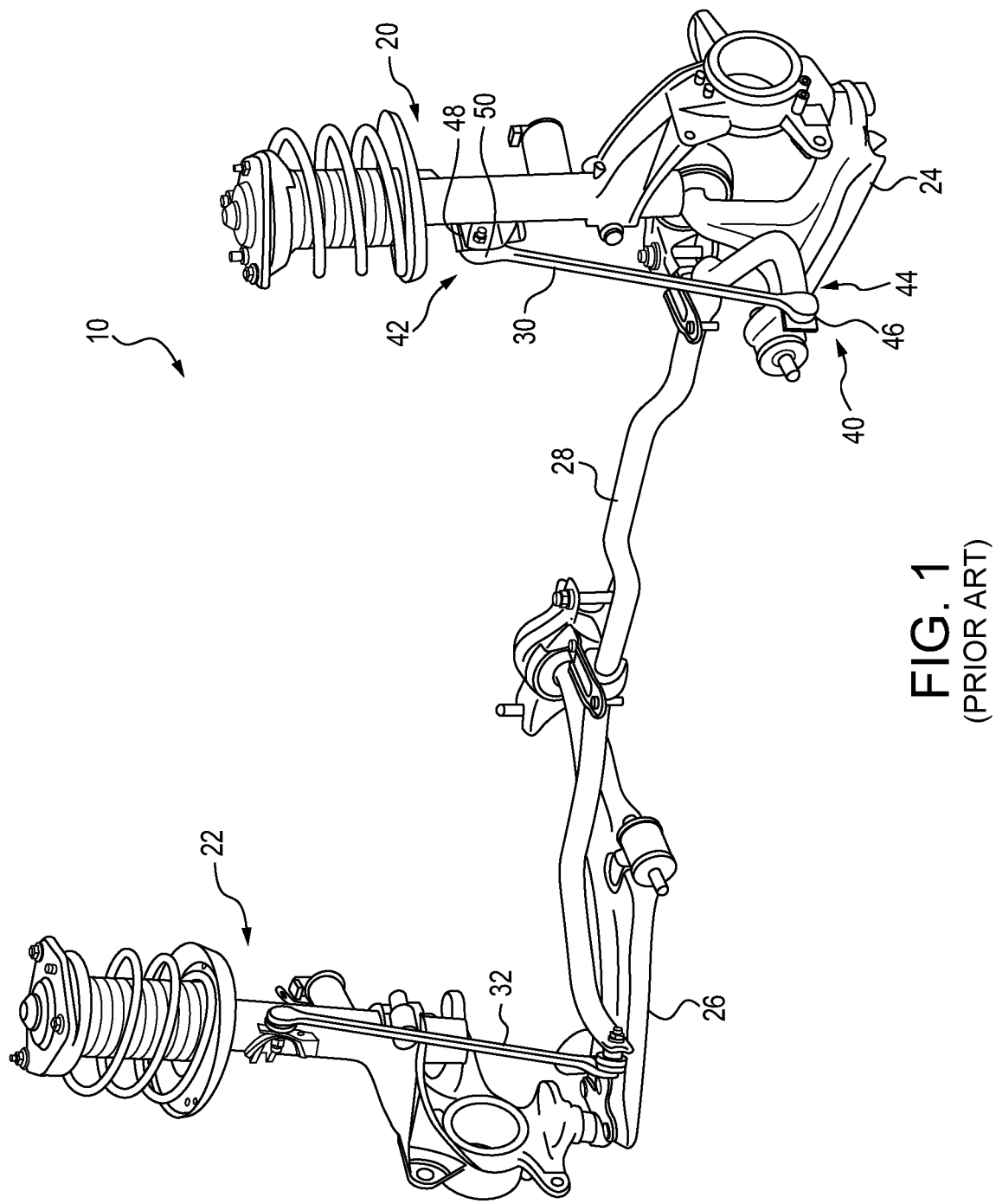
FIG. 1 is a perspective view of an exemplary embodiment of a vehicle suspension system.

FIG. 1 is a perspective view of an exemplary embodiment of a vehicle suspension system 10. In the exemplary embodiment, vehicle suspension system 10 includes a first shock absorber 20, a second shock absorber 22, a first lower control arm 24, a second lower control arm 26, a sway bar 28, a first stabilizer link 30, and a second stabilizer link 32. First stabilizer link 30 includes a lower end 40 and an upper end 42. In the exemplary embodiment, lower end 40 of first stabilizer link 30 is coupled to a first end 44 of the sway bar 28 through a first ball joint 46. Similarly, upper end 42 of first stabilizer link 30 is coupled to a bracket 48 extending from first shock absorber 20 through a second ball joint 50.

Figure 2:
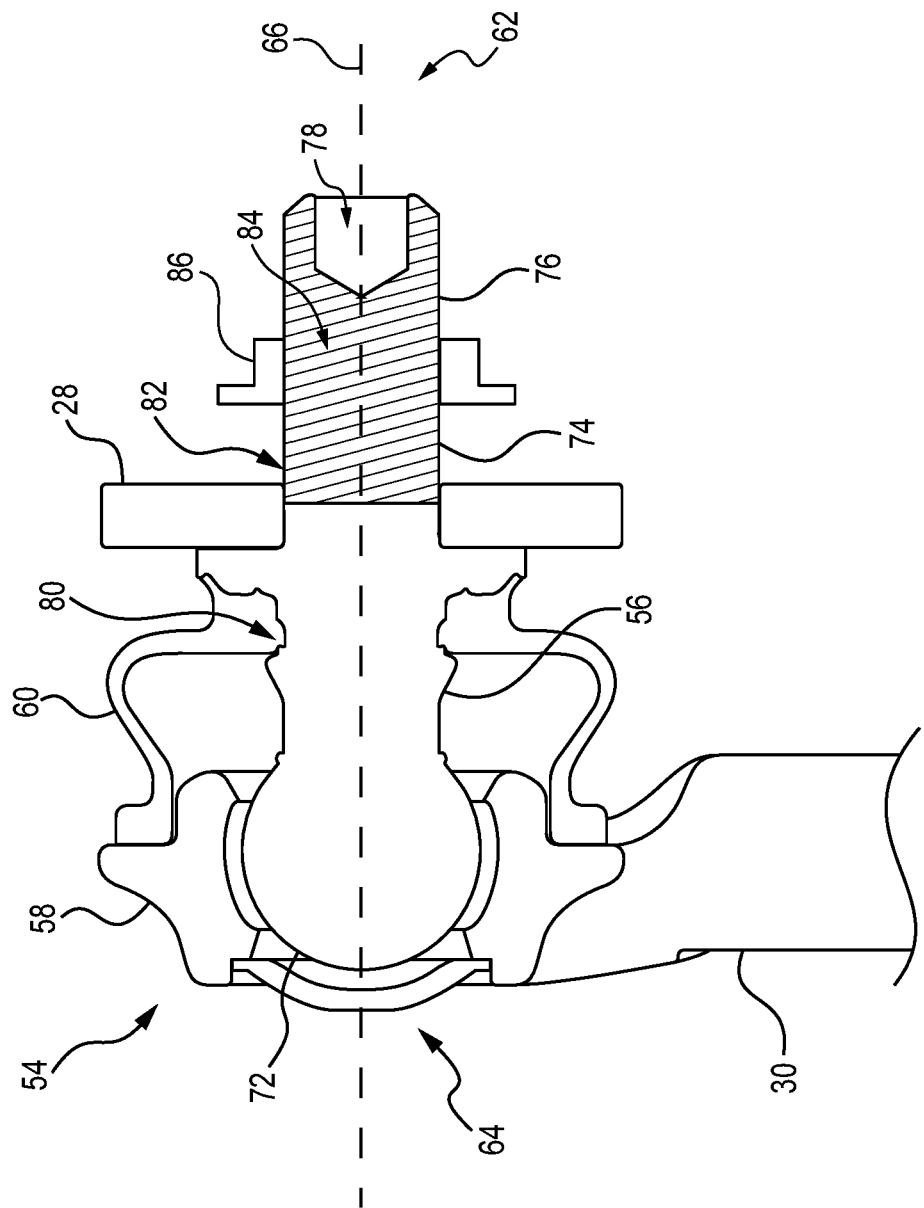
FIG. 2 is a cross-section view of an exemplary embodiment of a ball joint that may be included in the vehicle suspension system shown in FIG. 1.

FIG. 2 is a cross-section view of an exemplary ball joint 54. Ball joint 54 may be included in vehicle suspension system 10 (shown in FIG. 1), for example, as first ball joint 46, second ball joint 50, or as any other ball joint included in vehicle suspension system 10. Ball joint 54 includes a ball stud 56, a socket housing 58, and a flexible protective boot 60. In the exemplary embodiment, socket housing 58 is included within first stabilizer link 30. Ball stud 56 includes a first end 62 and a second end 64. A longitudinal axis 66 is defined through a center of ball stud 56 extending between first end 62 and second end 64. Second end 64 includes a ball 72 that corresponds in shape and size to socket housing 58.

Ball 72 may be substantially spherical and able to rotate about longitudinal axis 66 with respect to socket housing 58.

First end 62 includes a threaded portion 74 that includes threads on an outer surface 76. First end 62 also includes an opening 78 defined therein. For example, opening 78, which may also be referred to as a broach, may be a hexagonal shaped opening defined within first end 62 of ball stud 56. A specific example of a hexagonal shaped opening is configured for use with a hexagonal wrench, which may also be referred to as a hex key or a hex bit. In alternative embodiments, opening 78 has a substantially star shape and/or a square shape. A specific example of a star shape is configured for use with hexalobular key. Moreover, opening 78 may have any shape that allows the vehicle to be assembled as described herein.

Protective boot 60 includes an opening 80 defined therein and configured to extend around ball stud 56. During assembly of suspension system 10, ball stud 56 is positioned within an opening 82 defined within sway bar 28 and configured to extend through an opening 84 defined within a threaded nut 86. Threaded nut 86 is used to couple first ball joint 46 to sway bar 28. Nut 86 is sized, and includes threads, configured to correspond with the threads of threaded portion 74.

Figure 3:
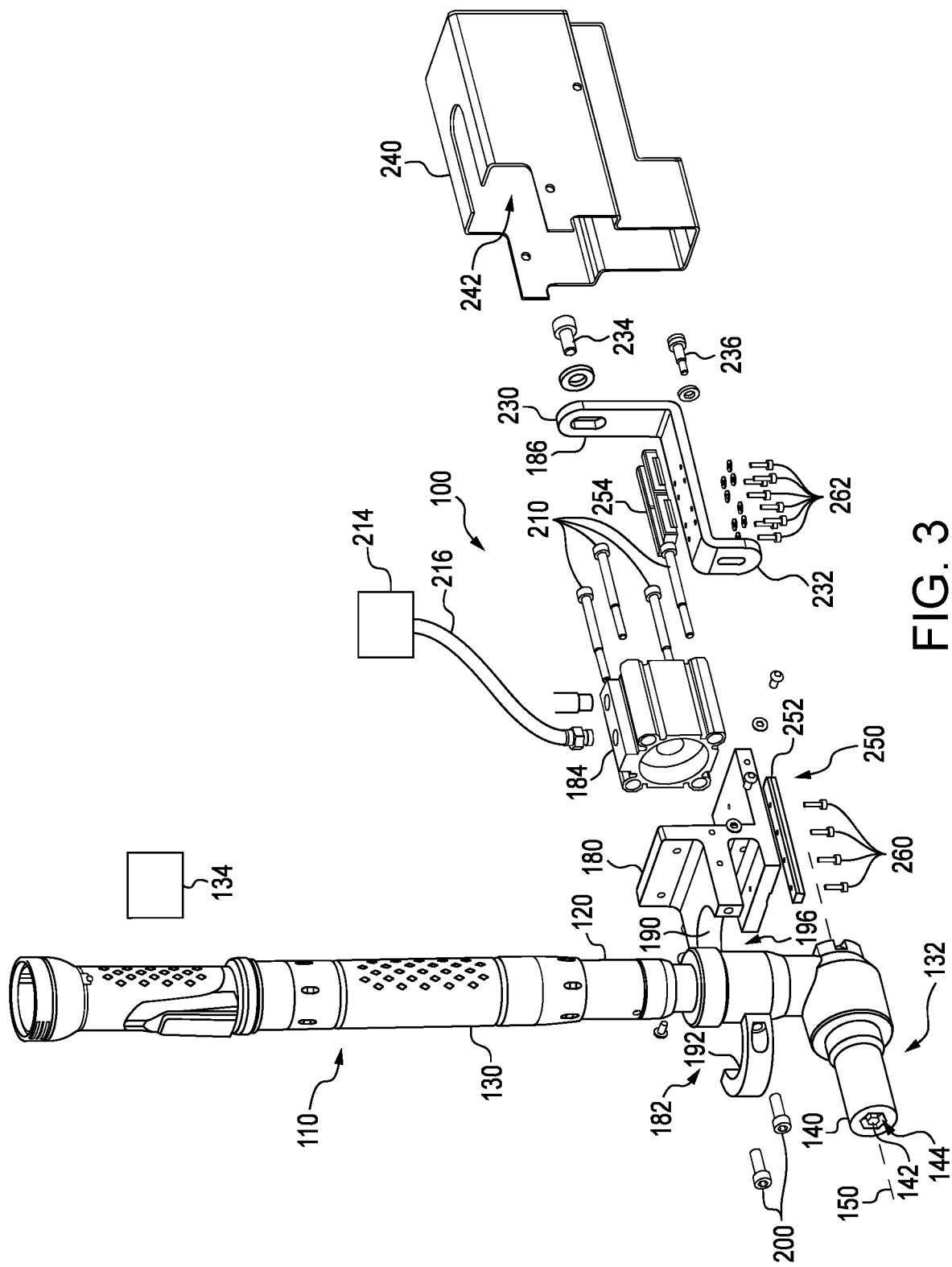
FIG. 3 is an exploded view of an exemplary embodiment of a retracting mechanism and hold and drive tool that may be used to assemble the vehicle suspension system shown in FIG. 1.

FIG. 3 is an exploded view of an exemplary embodiment of a retracting mechanism 100 and a hold and drive tool 110 that may be used to assemble vehicle suspension system 10 (shown in FIG. 1). Although described herein with respect to assembly of vehicle suspension system 10, retracting mechanism 100 and hold and drive tool 110 may be used to assemble any component that includes a threaded stud that includes a broach and a corresponding threaded nut. In the exemplary embodiment, hold and drive tool 110 is a direct current (DC) electric tool, a pneumatic tool, and/or any other type of threaded fastener tightening tool that allows the vehicle to be assembled as described herein. In the exemplary embodiment, retracting mechanism 100 is configured to be attached to a known hold and drive tool. In an alternative embodiment, retracting mechanism 100 is integrally formed with a hold and drive tool housing 120 and provided as a single product.

In the exemplary embodiment, hold and drive tool 110 includes a motorized drive unit 130, positioned within drive tool housing 120, and a drive head portion 132 coupled to the motorized drive unit 130. Motorized drive unit 130 includes, or is coupled to, a motor controller 134. For example, motor controller 134 may be included within drive tool housing 120, or motor controller 134 may be communicatively coupled to motorized drive unit 130 via wireless or wired communication. It is contemplated that motor controller 134 is a known controller configured to control a DC tool, and/or any other motor controller that allows hold and drive tool 110 to function as described herein. For example, motor controller 134 is configured to measure the amount of torque applied to a fastener and to stop applying torque when the amount of torque applied to the fastener reaches a stored, predefined value. The term controller, as used herein, refers to processors, central processing units, microprocessors, microcontrollers, reduced instruction set circuits (RISC), application specific integrated circuits (ASIC), logic circuits, programmable logic controller (PLC) and any other circuit or controller capable of executing the functions described herein.

Drive head portion 132 includes a socket 140 and a non-rotatable torque arrest member 142. In the exemplary embodiment, motorized drive unit 130 includes an electric motor 136, and drive head portion 132 includes a transfer mechanism 138 (e.g., gear(s)) configured to transfer rotation of the electric motor 136 to rotation of socket 140 about rotational axis 150. Furthermore, socket 140 includes an opening 144, for example, but not limited to, a hexagonal opening, decagonal opening, or dodecagonal (e.g., a six point socket, a ten point socket, or a twelve point socket), defined therein corresponding to a size of nut 86 (i.e., is configured to receive the nut). Non-rotatable torque arrest member 142 is rotationally fixed (i.e., does not rotate about rotational axis 150) and has a shape and size configured to fit within opening 78 (shown in FIG. 2). For example, non-rotatable torque arrest member 142 may include a hex key, a star key, a square key, and/or any other type of bit or wrench that interacts with opening 78 to prevent rotation of ball stud 56 with respect to socket housing 58 while hold and drive tool 110 rotates nut 86 around ball stud 56. Although described in reference to ball stud 56 that includes threaded portion 74, hold and drive tool 110 may also be used to rotate a nut onto other threaded studs, for example, but not limited to, a threaded bolt, screw, and/or any other type of threaded fastener.

Retracting mechanism 100 is configured to move non-rotatable torque arrest member 142, relative to socket 140, axially along the rotational axis 150 of socket 140. In the exemplary embodiment, retracting mechanism 100 includes a mounting bracket 180, a collar 182, a linear actuator 184, and a connecting bracket 186. In the exemplary embodiment, collar 182 includes a first portion 190, which is integrally formed in mounting bracket 180, and a second portion 192. An opening 196 is defined between first portion 190 and second portion 192 and corresponds in shape and size to a portion of housing 120. Fasteners 200 removably couple first portion 190 and second portion 192 and secure housing 120 there between. In an alternative embodiment at least one of first portion 190, second portion 192, and mounting bracket 180 are included as a portion of housing 120 (i.e., housing 120 may include attachment features configured to couple additional components of retracting mechanism 100 and hold and drive tool 110 together).

In the exemplary embodiment, linear actuator 184 is coupled to mounting bracket 180, for example, using fasteners 210. Linear actuator 184 includes an extension member 212 (shown in FIG. 8) and is configured to extend and retract extension member 212. Linear actuator 184 also includes, or is coupled to, a controller 214. Controller 214 controls operation of linear actuator, i.e., controls when extension member 212 is extended or retracted. Linear actuator controller 214 is communicatively coupled to motor controller 134 using known wired or wireless communication. Such technology may include, but is not limited to, Institute of Electrical and Electronics Engineers (IEEE) protocol 802.15.4, 802.11, 802.15.1, and/or 802.16. In an alternative embodiment, functions of linear actuator controller 214 are performed by motor controller 134 (i.e., a single controller performs the functions of both linear actuator controller 214 and motor controller 134). In the exemplary embodiment, linear actuator 184 includes a pneumatic cylinder. Pneumatic cylinder is provided with air through a supply tube 216. In this embodiment, controller 214, for example, a solenoid, controls when air is supplied to the pneumatic cylinder. In alternative embodiments, linear actuator 184 may include an electric linear actuator, a hydraulic cylinder, and/or any other type of linear actuator that allows retracting mechanism 100 to function as described herein.

Connecting bracket 186 includes a first end 230 and a second end 232. First end 230 is configured to be coupled to extension member 212, for example, by a fastener 234. Second end 232 is configured to be coupled to torque arrest member 142, for example, by a fastener 236. Connecting bracket 186 is configured to transfer motion of extension member 212 to non-rotatable torque arrest member 142.

In the exemplary embodiment, retracting mechanism 100 also includes a housing 240. Housing 240 is configured to at least partially enclose linear actuator 184 and connecting bracket 186. Housing 240 may protect components positioned within an interior 242 of housing 240 from contaminants, and may protect a user of hold and drive tool 110 from a potential pinch risk.

Moreover, in the exemplary embodiment, retracting mechanism 100 also includes a linear motion guide 250 configured to control motion of connecting bracket 186 with respect to mounting bracket 180. Linear motion guide 250 may include a male slide 252 and a female slide 254. The male slide 252 is coupled to mounting bracket 180, for example, using fasteners 260. The female slide 254 is coupled to connecting bracket 186, for example, using fasteners 262. Male slide 252 is configured to fit within a slot (not shown in FIG. 3) defined within female slide 254. Linear motion guide 250 allows relative motion between mounting bracket 180 and connecting bracket 186 only in a direction substantially aligned with rotational axis 150. When socket 140 is positioned around nut 86, and torque arrest member 142 is positioned at least partially within opening 78, rotational axis 150 is substantially aligned with longitudinal axis 66 (shown in FIG. 2). Therefore, retracting mechanism 100 is configured to remove torque arrest member 142 from within opening 78 by pulling torque arrest member 142 in a direction parallel to walls defining opening 78.

Figure 4:
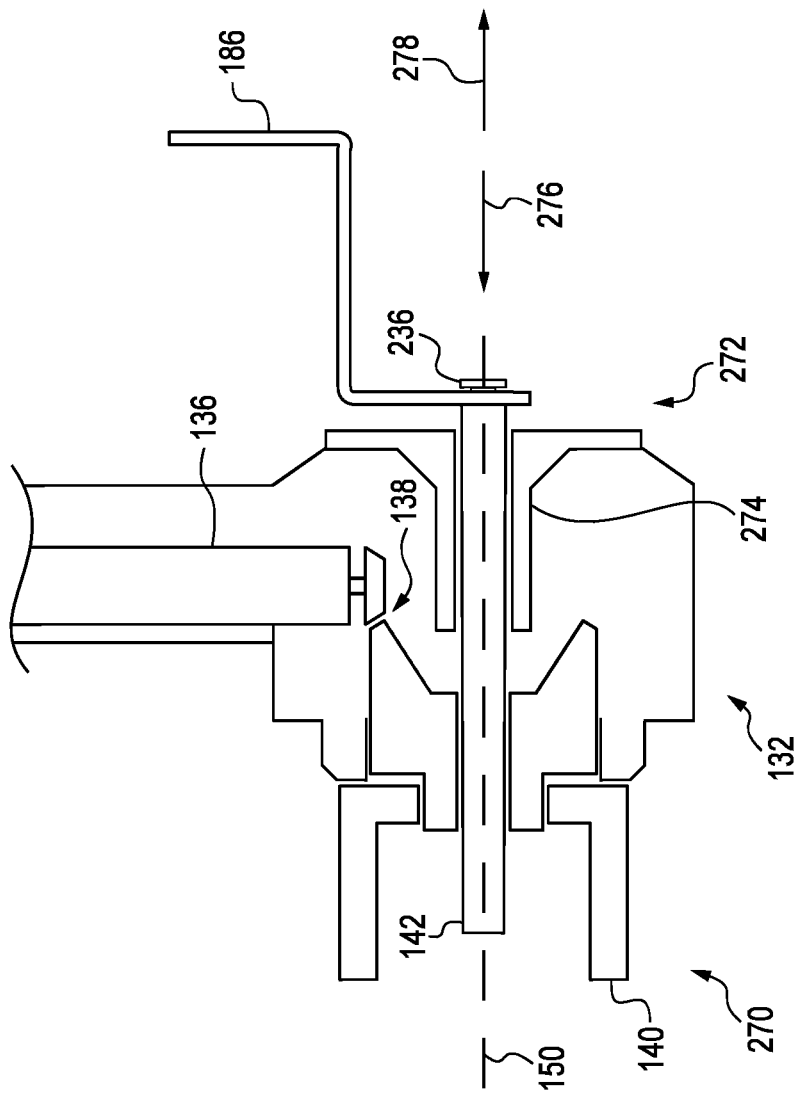
FIG. 4 is a cross-section view of the drive head portion of the hold and drive tool shown in FIG. 3.

FIG. 4 is a cross-section view of the drive head portion 132 of the hold and drive tool 110 shown in FIG. 3. In the exemplary embodiment, non-rotatable torque arrest member 142 extends through the drive head portion 132 from a socket side 270 to a rear side 272. Drive head portion 132 includes an opening 274. Non-rotatable torque arrest member 142 extends through opening 274. Opening 274 is configured to prevent rotation of non-rotatable torque arrest member 142 around rotational axis 150, while allowing non-rotatable torque arrest member 142 to axially move along rotational axis 150 (i.e., move in a first direction along axis 150, indicated by arrow 276, and move in a second direction along axis 150, indicated by arrow 278).

Figure 5:
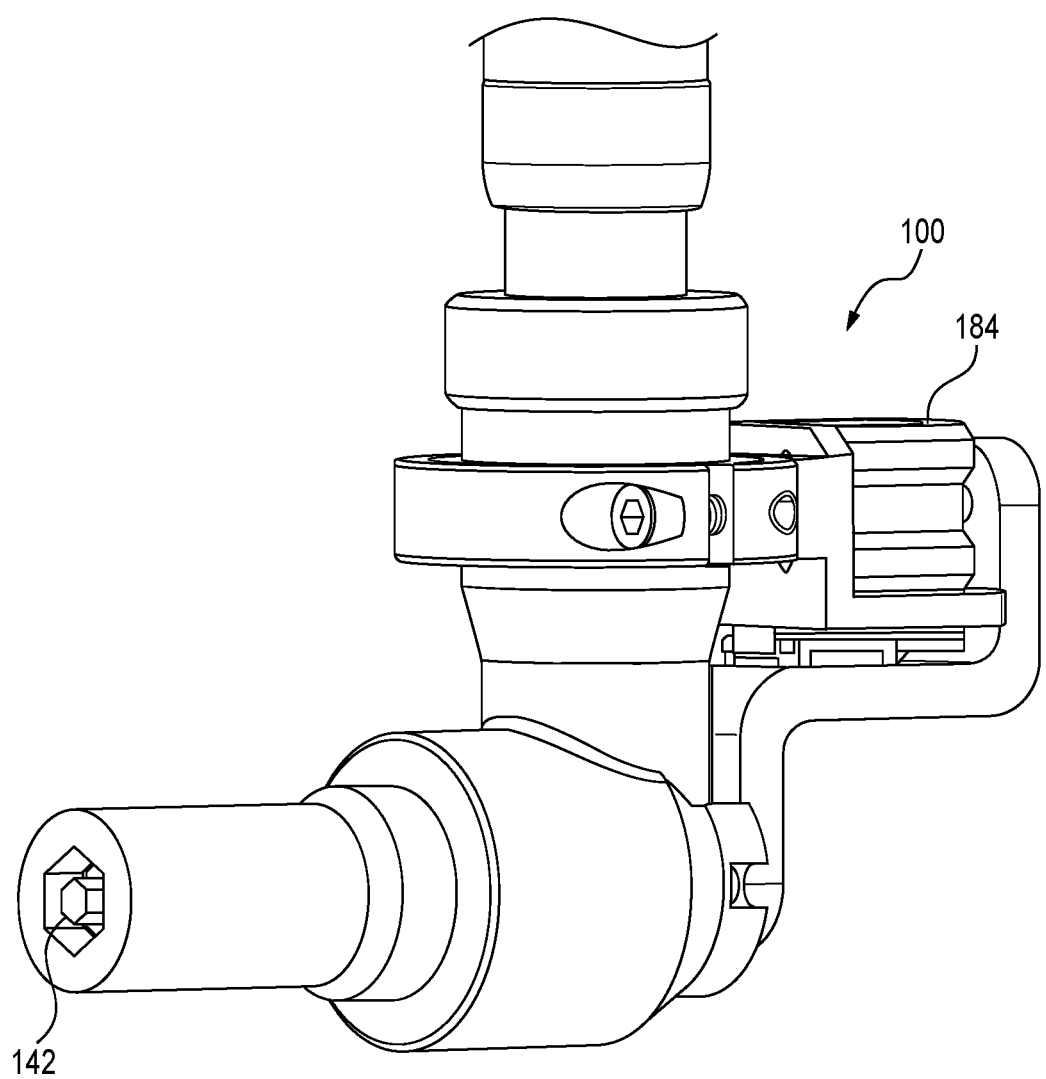
FIG. 5 is a first front perspective view of the retracting mechanism and hold and drive tool shown in FIG. 3.
Figure 6:
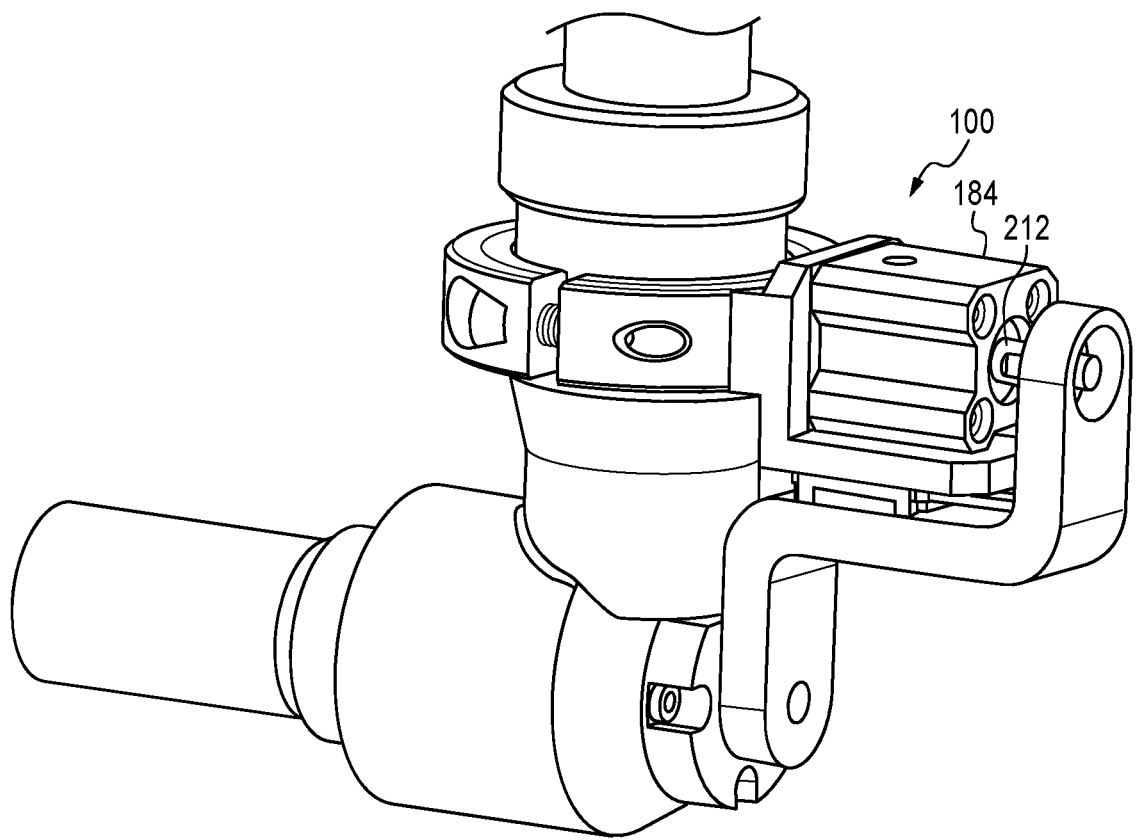
FIG. 6 is a first rear perspective view of the retracting mechanism and hold and drive tool shown in FIG. 3.

FIG. 5 is a first front perspective view of retracting mechanism 100 and hold and drive tool 110, shown in FIG. 3. Like parts are identified using the same reference numbers. FIG. 6 is a first rear perspective view of retracting mechanism 100 and hold and drive tool 110. In the views shown in FIGS. 5 and 6, linear actuator 184 is deactivated (i.e., extension member 212 is retracted) and non-rotatable torque arrest member 142 is in an extended position.

Figure 7:
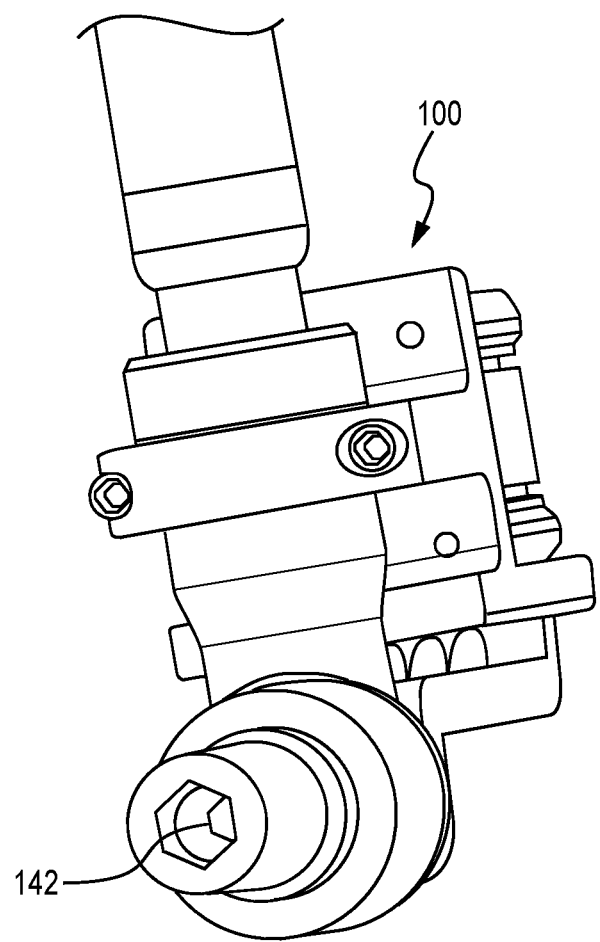
FIG. 7 is a second front perspective view of the retracting mechanism and hold and drive tool shown in FIG. 3.
Figure 8:
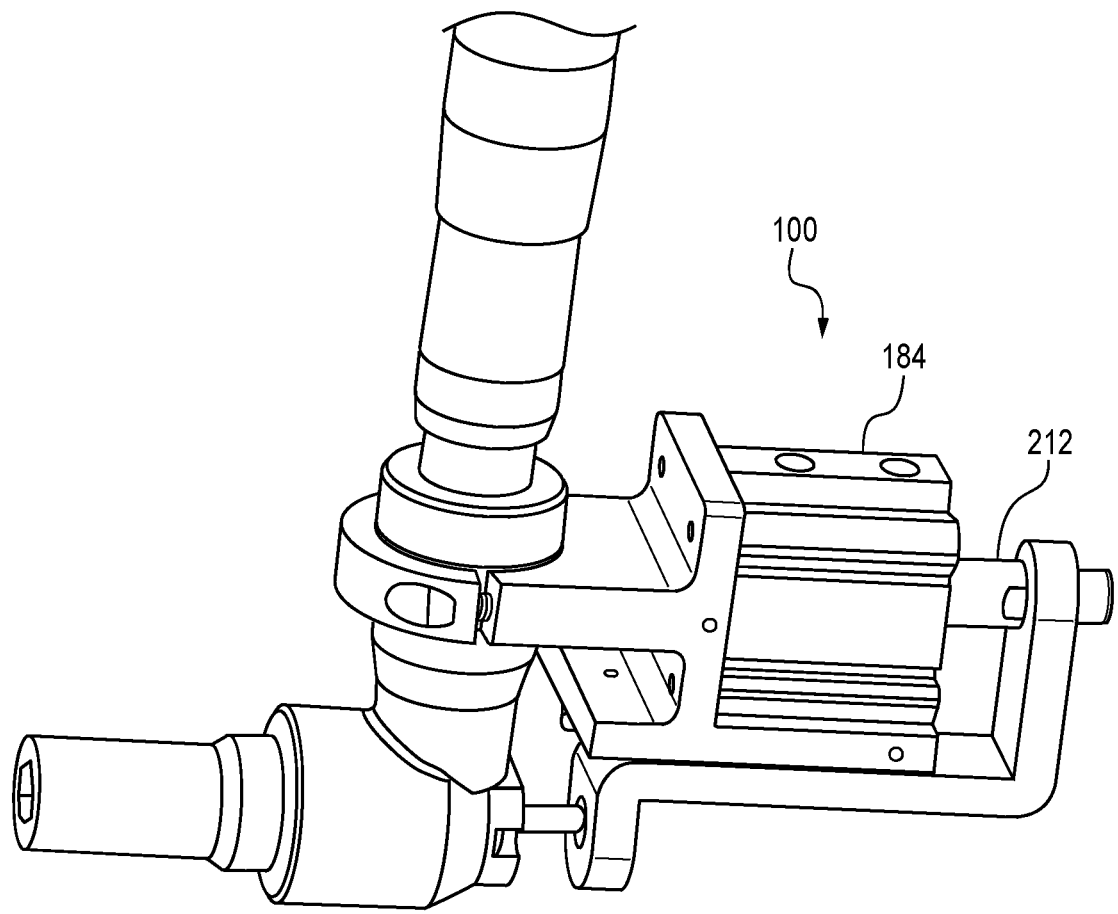
FIG. 8 is a second rear perspective view of the retracting mechanism and hold and drive tool shown in FIG. 3.

FIG. 7 is a second front perspective view of retracting mechanism 100 and hold and drive tool 110. FIG. 8 is a second rear perspective view of retracting mechanism 100 and hold and drive tool 110. In the views shown in FIGS. 7 and 8, linear actuator 184 has been activated, and accordingly, extension member 212 is extended and non-rotatable torque arrest member 142 is in a retracted position.

Figure 9:
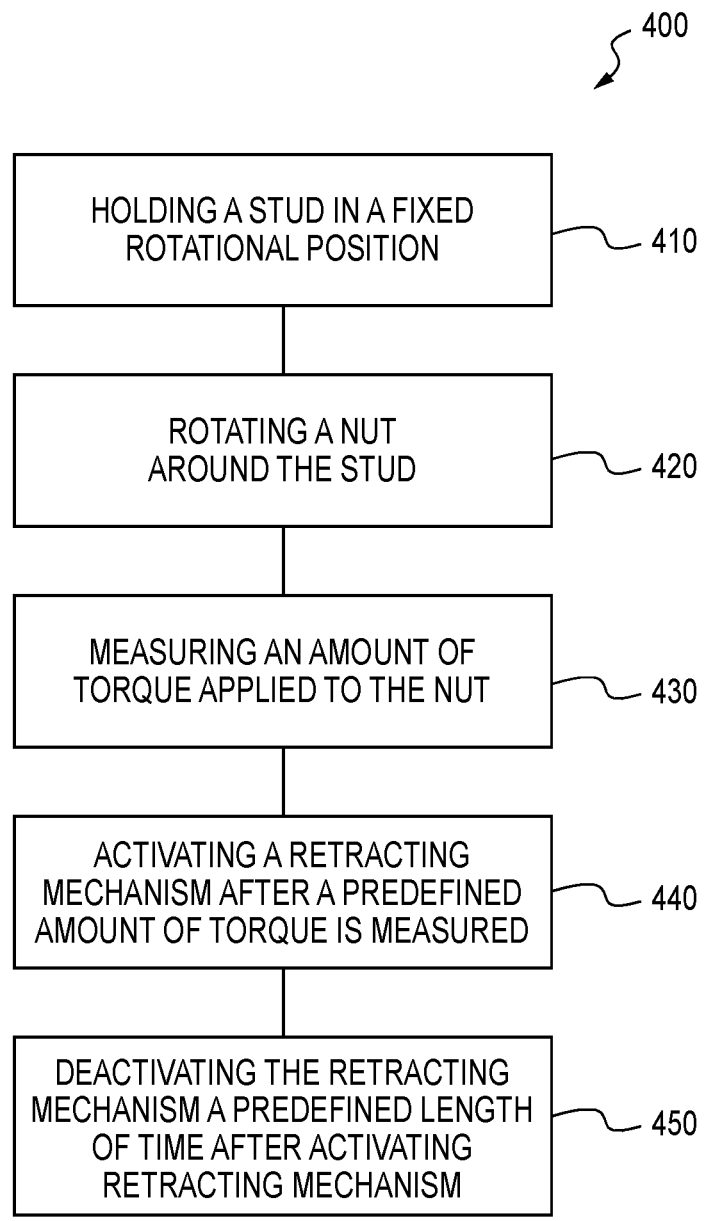
FIG. 9 is a flow chart of an exemplary method of tightening a fastener using the hold and drive tool shown in FIGS. 3-8.

FIG. 9 is a flow chart of an exemplary method 400 of tightening a fastener using the hold and drive tool 110 shown in FIGS. 3-8. More specifically, method 400 facilitates tightening a nut, for example, nut 86 (shown in FIG. 2), onto a threaded fastener, for example, ball stud 56 (shown in FIG. 2). For example, hold and drive tool 110 may be used to tighten nut 86.

In the exemplary embodiment, method 400 includes holding 410 ball stud 56 in a fixed rotational position using a non-rotatable torque arrest member, for example, non-rotatable torque arrest member 142 (shown in FIG. 3). As described above, ball stud 56 includes first end 62 configured to extend through opening 84 defined within nut 86. First end 62 also includes opening 78 defined therein. Holding 410 includes positioning non-rotatable torque arrest member 142 at least partially within opening 78.

Method 400 also includes rotating 420 nut 86 around ball stud 56. For example, hold and drive tool 110 rotates socket 140 which when positioned around nut 86, causes nut 86 to rotate. Method 400 also includes measuring 430 an amount of torque applied to nut 86. Measuring 430 the torque applied to nut 86 ensures that the desired tension and/or loading of the fastener is achieved. In the exemplary embodiment, measuring 430 the torque is performed by motor controller 134 (shown in FIG. 3). Method 430 also includes activating 440 a retracting mechanism, for example, retracting mechanism 100 (shown in FIG. 3) after a predefined amount of torque is measured. For example, motor controller 134 stores a predefined torque value and provides a signal to linear actuator controller 214 when the amount of torque measured equals the predefined torque value. In at least some embodiments, the predefined torque value is greater than 50 newton-meter (Nm). More specifically, the predefined torque value may be between 55 Nm and 90 Nm. Even more specifically, the predefined torque value may be between 59 Nm and 80 Nm, however, the predefined torque value may be any value and is dependent upon the requirements of the parts being assembled. Linear actuator controller 214 activates 440 retracting mechanism 100 upon receipt of the signal. In an alternative embodiment, motor controller 134 may be configured to activate retracting mechanism 100 without use of a separate linear actuator controller. Method 430 may also include discontinuing rotating nut 86 around bolt 56 after the predefined amount of torque is measured.

In the exemplary embodiment, activating 440 retracting mechanism 100 includes energizing a solenoid valve of retracting mechanism 100 to activate at least one of a pneumatic and a hydraulic cylinder, for example, linear actuator 184 (shown in FIG. 3). Activating linear actuator 184 causes extension of extension member 212 and retraction of non-rotatable torque arrest member 142 (see FIGS. 7 and 8). Retracting non-rotatable torque arrest member 142 removes the torque arrest member from opening 78 and enables a user to remove the hold and drive tool 110 from the tightened fastener without negatively effecting the torque applied to the tightened fastener (i.e., maintains the amount of torque applied to the fastener).

Method 400 also includes deactivating 450 retracting mechanism 100 a predefined length of time after activating 440 retracting mechanism 100. For example, retracting mechanism 100 may be deactivated approximately one to ten seconds after activating the retracting mechanism. More specifically, retracting mechanism 100 may be deactivated approximately two to five seconds after activating the retracting mechanism. By automatically deactivating 450 the retracting mechanism (i.e., returning non-rotatable torque arrest member 142 to the extended position (shown in FIGS. 5 and 6)), hold and drive tool 110 is placed in the configuration needed to tighten a subsequent fastener. Non-rotatable torque arrest member 142 remains in the retracted position long enough for the associate to remove the hold and drive tool 110 from the tightened fastener.

Described herein are exemplary methods and systems for improving usability of a hold and drive tool. More specifically, the methods and systems described herein facilitate increasing the ease in which the hold and drive tool can be removed from a tightened fastener by automatically removing a torque arrest member from a fastener opening after a desired torque value is achieved. The methods and systems described herein may reduce variations from the desired tension and/or loading of the fastener.

Some aspects of the methods and systems described herein may be implemented using computer programming or engineering techniques including computer software, firmware, hardware or any combination or subset thereof, wherein the technical effect may include at least one of: (a) measuring the torque applied to a nut ensures that the desired tension and/or loading of the fastener is achieved; (b) discontinuing rotating the nut around the stud after a predefined amount of torque is measured; (c) activating a retracting mechanism after the predefined amount of torque is measured to facilitate easy removal of the tool from the tightened fastener; and (d) deactivating the retracting mechanism a predefined length of time after activating the retracting mechanism.

Exemplary embodiments of systems and methods for retracting a tool bit are described above in detail. The systems and methods described herein facilitate ergonomic, efficient, and economical tightening of fasteners and removal of the fastening tool. The systems and methods described herein are not limited to the specific embodiments described herein, but rather, components of the systems and/or steps of the methods may be utilized independently and separately from other components and/or steps described herein.

When introducing elements/components/etc. of the methods and systems described and/or illustrated herein, the articles "a", "an", "the", and "said" are intended to mean that there are one or more of the element(s)/component(s)/ect. The terms "comprising", "including", and "having" are intended to be inclusive and mean that there may be additional element(s)/component(s)/etc. other than the listed element(s)/component(s)/etc.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hold and drive tool for driving a target nut on a target threaded stud, the target threaded stud including a first end, a second end, and a recess defined within the first end, said hold and drive tool comprising:
   a motorized drive unit;
   a drive head portion coupled to said motorized drive unit and comprising:
      a socket defining a rotational axis configured to be positioned around the target nut;
      a non-rotatable torque arrest member substantially aligned with the rotational axis of said socket and configured to fit at least partially within the recess defined within the first end of the target threaded stud; and
   a retracting mechanism including a mounting bracket, a linear actuator and a connecting bracket, wherein the linear actuator is coupled to the mounting bracket and to a first end of the connecting bracket with a second end of the connecting bracket coupled to the non-rotatable torque arrest member, wherein the second end is spaced along the rotational axis from the first end,
   wherein upon receipt of a signal, the linear actuator moves said non-rotatable torque arrest member, relative to said socket, along the rotational axis of said socket and away from the target threaded stud, while the target nut remains within said socket, to remove said non-rotatable torque arrest member from within the recess.

2. A hold and drive tool in accordance with claim 1, wherein said motorized drive unit comprises a direct current (DC) motor.

3. A hold and drive tool in accordance with claim 1, wherein said socket includes a hexagonal opening defined therein corresponding to a size of the target nut.

4. A hold and drive tool in accordance with claim 1, wherein said non-rotatable torque arrest member comprises one of a hex key, a star key, and a square key.

5. A hold and drive tool in accordance with claim 1, wherein said retracting mechanism comprises a solenoid valve and a cylinder.

6. A hold and drive tool in accordance with claim 5, wherein said solenoid valve is electrically operated and configured to selectively activate said cylinder.

7. A hold and drive tool in accordance with claim 1, further comprising a controller communicatively coupled to said motorized drive unit and said retracting mechanism, wherein said controller is configured to control said motorized drive unit to apply a predefined amount of torque to the target threaded stud and to provide the signal to said retracting mechanism to activate said retracting mechanism.

8. A hold and drive tool in accordance with claim 7, wherein said controller is configured to provide the signal to activate said retracting mechanism when the predefined amount of torque has been applied.

9. A hold and drive tool in accordance with claim 7, wherein said controller is configured to deactivate said retracting mechanism a predefined length of time after activation of said retracting mechanism.

10. A method of tightening a nut onto a threaded stud using a hold and drive tool, said method comprising:
    providing a hold and drive tool comprising a motorized drive unit, a drive head portion coupled to said motorized drive unit and including a socket defining a rotational axis configured to be positioned around the nut, a non-rotatable torque arrest member substantially aligned with the rotational axis of said socket and configured to fit at least partially within a recess defined within a first end of the threaded stud, a retracting mechanism including a mounting bracket, a linear actuator and a connecting bracket, wherein the linear actuator is coupled to the mounting bracket and to a first end of the connecting bracket with a second end of the connecting bracket coupled to the non-rotatable torque arrest member, wherein the second end is spaced along the rotational axis from the first end;
    holding the threaded stud in a fixed rotational position using the non-rotatable torque arrest member;

rotating the nut around the threaded stud; measuring an amount of torque applied to the nut; and activating the retracting mechanism to move the non-rotatable torque arrest member relative to the socket along the rotational axis of the socket and away from the threaded stud, while the nut remains within the socket, after a predefined amount of torque is measured.

11. A method in accordance with claim 10, wherein activating the retracting mechanism comprises:
energizing a solenoid valve of the retracting mechanism to activate at least one of a pneumatic and a hydraulic cylinder.

12. A method in accordance with claim 10, further comprising deactivating the retracting mechanism a predefined length of time after activating the retracting mechanism.

13. A method in accordance with claim 12, wherein deactivating the retracting mechanism a predefined length of time after activating the retracting mechanism comprises deactivating the retracting mechanism approximately one second to ten seconds after activating the retracting mechanism.

\* \* \* \* \*